Figure 1:
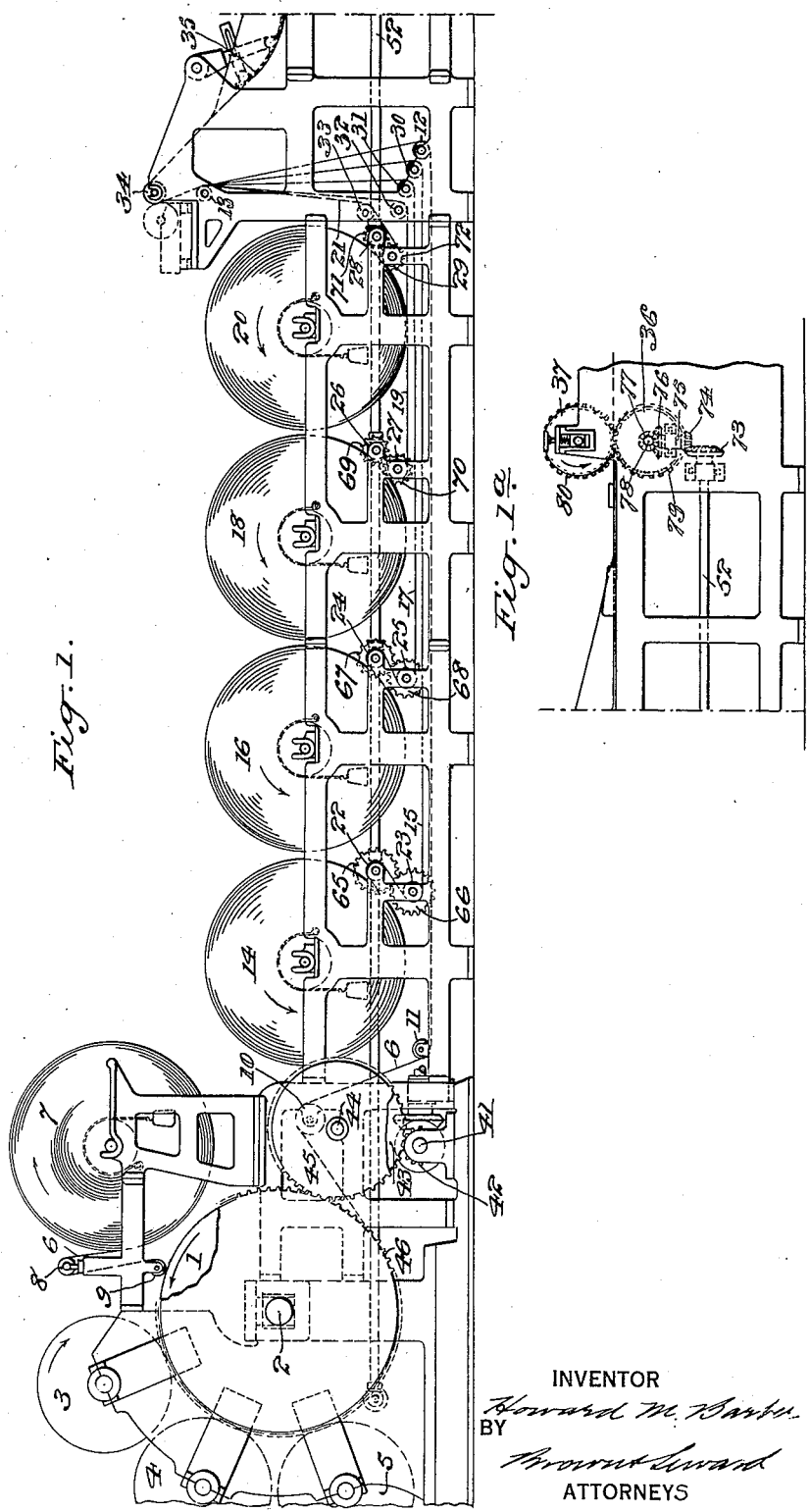

Oct. 6, 1931.    H. M. BARBER    1,826,446
MULTIWEB HANDLING MACHINE
Filed Dec. 1, 1928    2 Sheets-Sheet 2

Fig. 2.

INVENTOR
Howard M. Barber
BY
Thomas Howard
ATTORNEYS

Patented Oct. 6, 1931

1,826,446

UNITED STATES PATENT OFFICE

HOWARD M. BARBER, OF PAWCATUCK, CONNECTICUT, ASSIGNOR TO C. B. COTTRELL & SONS COMPANY, OF WESTERLY, RHODE ISLAND, A CORPORATION OF DELAWARE

MULTIWEB HANDLING MACHINE

Application filed December 1, 1928. Serial No. 323,039.

Heretofore where the direction of travel of a plurality of associated webs has been changed by passing them around a common roll at the same predetermined speed, there has been a tendency of the inner web or webs to wrinkle due to the "building up" of the effective diameter of the roll by each successive web.

The object of my invention is to prevent this tendency of the inner web or webs to wrinkle by providing means for controlling the speeds of the several webs, whereby the webs will be fed to the roll at successively increased speeds from the inner web to the outer web.

In the accompanying drawings I have shown my invention as applied to a multitubular bag machine in which the web which is intended to be the outer layer of the bag is passed through a printing unit and is then fed together with the lining web or webs around a paster roll to the means for folding the associated webs longitudinally into multiply tubular form from which the bag blanks are subsequently cut.

A practical embodiment of my invention is represented in the accompanying drawings, in which Figs 1 and 1ª represent in side elevation a multi-color printing unit, a portion of a multiweb tubing machine and the intermediate multiweb feeding unit.

Figure 2:
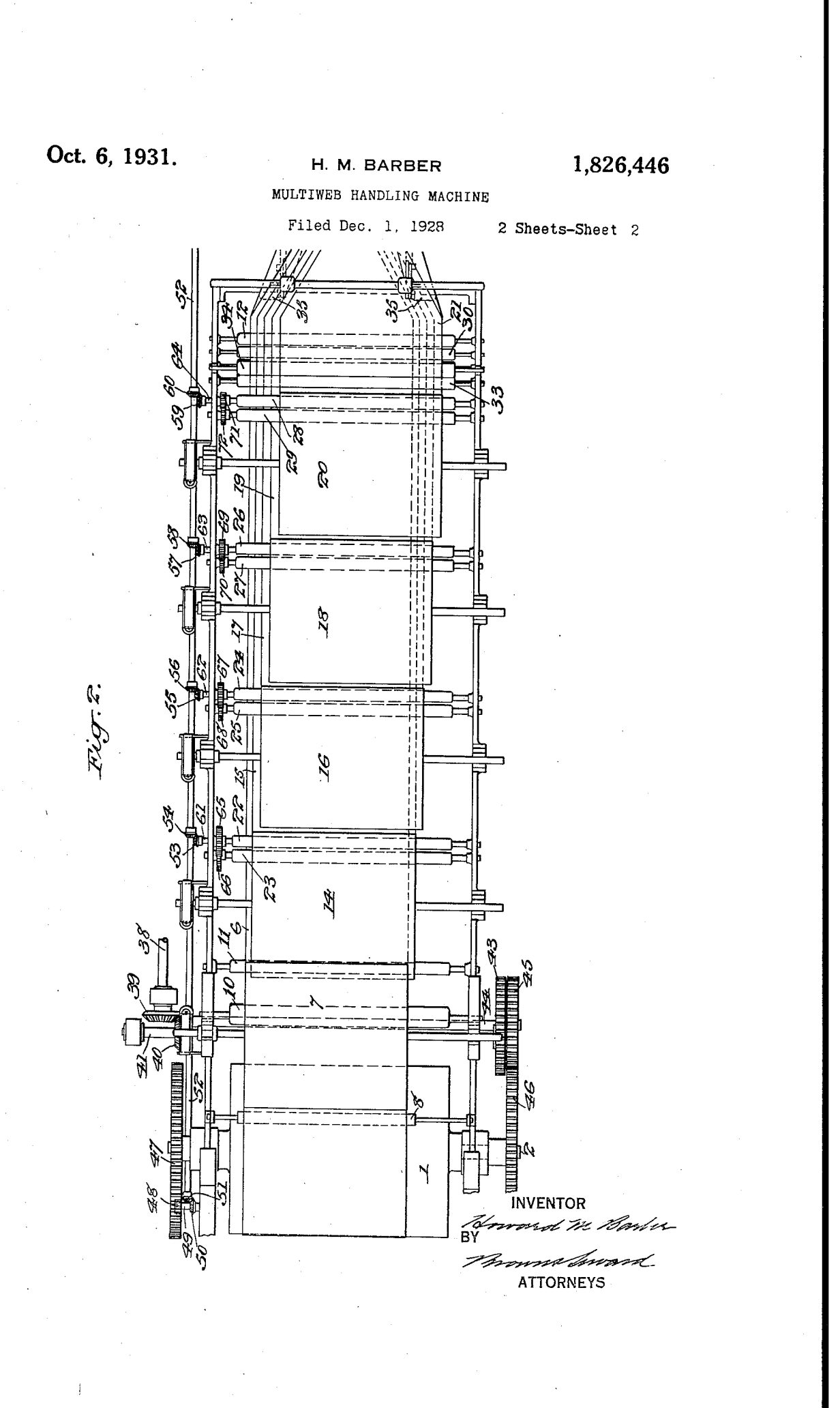

Fig. 2 represents a partial top plan view of the same.

The impression cylinder of the multi-color printing unit is denoted by 1 and its shaft by 2. The form cylinders are denoted by 3, 4 and 5. The web which is to be printed and which is intended to form the outer layer of the bag, is fed from its supply roll 7 around the rolls 8 and 9, to and around the impression cylinder 1. From thence the printed web is passed around the guide rolls 10, 11 and 12 to the web gathering roll 13. It is to be understood that the speed of this web 6 is controlled by the printing unit.

In the accompanying drawings I have shown four lining web supply rolls 14, 16, 18 and 20, located between the printing unit and the tubing machine, from which supply rolls their webs 15, 17, 19 and 21 are fed at predetermined successively increased speeds by their respective pairs of coacting feed rolls 22—23, 24—25, 26—27, and 28—29, around their respective guide rolls 30, 31, 32 and 33 to the said web gathering roll 13 where they are brought into association with the printed web 6 and are fed around a common element, such as a paster roll 34, with the printed web 6 in contact with the said element or roll. These lining webs 15, 17, 19 and 21 are fed at successively increased speeds, it being understood that the speed of the printed web is less than the speed of its adjacent lining web 15 and as hereinbefore explained the speed of this printed web is controlled by the printing unit.

The associated printed and lining webs are then passed in their changed direction of travel from the paster roll 34 into engagement by the tube forming devices 35, 35 of the tubing machine. A pair of coacting web feed rolls 36, 37 which form a part of the tubing machine are driven at a predetermined speed, slightly greater than that of the associated webs for exerting a slip pull thereon, to keep the webs taut without danger of tearing them.

The means which I have shown for controlling the speeds of the lining webs is constructed, arranged and operated as follows:

The drive for the printing unit is herein shown as including the longitudinally disposed main drive shaft 38, which has a bevel gear driving connection 39, 40 with a cross shaft 41. A pinion 42 on this cross shaft meshes with a gear 43 on the shaft 44, a change gear 45 on this shaft meshing with a gear 46 on the impression cylinder shaft 2.

Another gear 47 on the impression cylinder shaft 2 meshes with a pinion 48 on a cross stud shaft 49, which shaft in turn has a bevel gear driving connection 50, 51 with a longitudinally disposed shaft 52. This shaft 52 has a plurality of bevel gear driving connections 53, 54, 55, 56, 57, 58 and 59, 60 with the shafts 61, 62, 63 and 64 respectively of the upper web feed rolls 22, 24, 26 and 28, the lower web feed rolls 23, 25, 27 and 29 being driven from the upper web feed rolls by pairs of coacting gears 65, 66, 67, 68, 69, 70 and 71, 72 of predetermined successively decreased diameters, so that the said pairs of web feed rolls are driven at predetermined successively increased surface speeds.

The shaft 52 also has a bevel gear driving connection 73, 74 with a short vertical shaft 75, which in turn has a bevel gear driving connection 76, 77 with the shaft 78 of the lower web feed roll 36 of the tubing machine. The upper web feed roll 37 is driven from the lower web feed roll 36 through the gears 79, 80.

From the above description it will be seen that I am enabled to control the speed of each of the webs so that the direction of the associated webs may be changed without danger of causing the inner web or webs to wrinkle, and the associated webs may be fed through the tubing machine by means exerting a slip pull thereon, to keep the associated webs taut without danger of tearing the same.

It is evident that various changes may be resorted to in the construction, form and arrangement of the several parts without departing from the spirit and scope of my invention, hence I do not wish to be limited to the particular embodiment herein shown and described, but

What I claim is:

1. In a multiweb handling machine, an element around which a plurality of associated webs are passed, a plurality of web feeding rolls arranged to feed the webs to said element at predetermined successively increased speeds, and means beyond the said element for exerting a slip pull on the webs to keep them taut.

2. In a multiweb handling machine, an element around which a printed web together with a plurality of unprinted lining webs are passed with the printed web in contact with said element, a printing unit, means for feeding the web to be printed therethrough to said element at a predetermined speed, and separate means for feeding the plurality of unprinted lining webs to said element at predetermined successively increased speeds.

3. In a multiweb handling machine, an element around which a plurality of associated printed and lining webs are passed, a printing unit, means for feeding the web to be printed therethrough to said element at a predetermined speed, means for feeding the lining webs to the element at predetermined successively increased speeds, and means beyond the said element for exerting a slip pull on the webs to keep them taut.

4. In a multiweb handling machine, an element around which a plurality of associated printed and lining webs are passed, a printing unit, means for feeding the web to be printed therethrough to said element at a predetermined speed, means for feeding the lining webs to the element at predetermined successively increased speeds, a tubing machine, and means therein for exerting a slip pull on the webs to keep them taut.

5. In a multiweb handling machine, a plurality of web supply rolls, web feeding rolls therefor, an element around which the associated webs are passed, means for positively driving the web feeding rolls at predetermined successively increased surface speeds to feed the webs to the said element, and means beyond the said element for exerting a slip pull on the webs to keep them taut.

6. In a multiweb handling machine, a plurality of web supply rolls, web feeding rolls therefor, an element around which the associated webs are passed, means for positively driving the web feeding rolls at predetermined successively increased surface speeds to feed the webs to the said element, and means beyond the said element and positively driven from the said web feeding roll driving means for exerting a slip pull on the webs to keep them taut.

In testimony that I claim the foregoing as my invention, I have signed my name this 28th day of November, A. D. 1928.

HOWARD M. BARBER.